(12) United States Patent
Ikeda et al.

(10) Patent No.: US 9,390,758 B2
(45) Date of Patent: Jul. 12, 2016

(54) LIBRARY APPARATUS, STORAGE MEDIUM INITIALIZATION METHOD AND LIBRARY CONTROLLER

(71) Applicant: FUJITSU LIMITED, Kawasaki-shi, Kanagawa (JP)

(72) Inventors: Shinya Ikeda, Tokyo (JP); Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/579,215

(22) Filed: Dec. 22, 2014

(65) Prior Publication Data
US 2015/0193149 A1 Jul. 9, 2015

(30) Foreign Application Priority Data

Jan. 8, 2014 (JP) ................................. 2014-001702

(51) Int. Cl.
*G11B 27/11* (2006.01)
*G06F 3/06* (2006.01)
(Continued)

(52) U.S. Cl.
CPC .............. *G11B 27/11* (2013.01); *G06F 3/0604* (2013.01); *G06F 3/0632* (2013.01); *G06F 3/0686* (2013.01); *G11B 27/002* (2013.01); *G11B 27/107* (2013.01); *G06F 2003/0698* (2013.01); *G11B 2220/41* (2013.01)

(58) Field of Classification Search
None
See application file for complete search history.

(56) References Cited

U.S. PATENT DOCUMENTS

| | | | | |
|---|---|---|---|---|
| 6,043,948 A * | 3/2000 | Takayama | ............... | G11B 15/12 360/69 |
| 6,075,669 A * | 6/2000 | Takayama | ............... | G11B 15/12 360/69 |
| 6,182,191 B1 * | 1/2001 | Fukuzono | ............... | G11B 27/11 711/111 |

(Continued)

FOREIGN PATENT DOCUMENTS

| | | |
|---|---|---|
| EP | 2 063 429 A1 | 5/2009 |
| JP | 05-258433 | 10/1993 |

(Continued)

OTHER PUBLICATIONS

G. A. Jaquette, "LTO: A better format for mid-range tape," *IBM Journal of Research and Development*, vol. 47, No. 4, Jul. 2003, pp. 429-444.

(Continued)

*Primary Examiner* — Wayne Young
*Assistant Examiner* — James L Habermehl
(74) *Attorney, Agent, or Firm* — Staas & Halsey LLP

(57) ABSTRACT

A library apparatus includes an initialization processing unit and an operation processing unit. The initialization processing unit, when accepting an initialization request to initialize a storage medium to which a wireless communication device is added, the wireless communication device including an IC chip with management information and including an electronic paper with a display unit for displaying the management information, stores a label name of the storage medium and data in the management information, the label name being acquired through the initialization request, and the data being written to a block used as an index label of the storage medium. The operation processing unit, when loading the storage medium into a drive, writes the data that the initialization processing unit has stored in the management information corresponding to the storage medium to the block used as the index label of the storage medium.

8 Claims, 11 Drawing Sheets

(51) Int. Cl.
*G11B 27/00* (2006.01)
*G11B 27/10* (2006.01)

(56) References Cited

U.S. PATENT DOCUMENTS

| | | | | |
|---|---|---|---|---|
| 6,195,007 | B1* | 2/2001 | Takayama | G11B 27/002 235/375 |
| 6,476,725 | B2* | 11/2002 | Aguren | G06K 19/077 360/137 |
| 6,600,868 | B2* | 7/2003 | Tokashiki | G11B 27/002 386/230 |
| 6,611,394 | B1* | 8/2003 | Kato | G11B 15/07 360/69 |
| 2003/0067702 | A1* | 4/2003 | Iles | G11B 23/0305 360/69 |
| 2005/0188246 | A1* | 8/2005 | Emberty | G06F 3/0607 714/5.11 |
| 2006/0180694 | A1 | 8/2006 | Battles et al. | |
| 2010/0046108 | A1 | 2/2010 | Anna et al. | |

FOREIGN PATENT DOCUMENTS

| | | |
|---|---|---|
| JP | 05-258535 | 10/1993 |
| JP | 2005-332043 | 12/2005 |
| JP | 2011-022720 | 2/2011 |
| JP | 2012-243346 | 12/2012 |

OTHER PUBLICATIONS

Extended European Search Report mailed Jul. 15, 2015 for corresponding European Patent Application No. 14199268.5.

* cited by examiner

| 630a | 630b | 630c | 630d |
|---|---|---|---|
| VOLUME IDENTIFIER | MEDIUM TYPE | LABEL NAME STATUS | LABEL NAME DATA BLOCK |
| LABEL NAME OF MEDIUM | DATA MEDIUM/ CLEANING MEDIUM | WRITE IS DONE/ NOW EMULATING/ NO LABEL NAME | DATA OF VOL1 (80 BYTES) |

FIG.7

| CELL NUMBER | STATUS |
|---|---|
| #0 | NORMAL CELL |
| #1 | NO MEDIUM |
| #2 | NO MEDIUM |
| #3 | SCRATCH POOL |
| #4 | NO MEDIUM |
| #5 | NO MEDIUM |
| #6 | NO MEDIUM |
| #7 | NO MEDIUM |
| ... | ... |

110

LIBRARY APPARATUS, STORAGE MEDIUM INITIALIZATION METHOD AND LIBRARY CONTROLLER

CROSS-REFERENCE TO RELATED APPLICATION(S)

This application is based upon and claims the benefit of priority of the prior Japanese Patent Application No. 2014-001702, filed on Jan. 8, 2014, the entire contents of which are incorporated herein by reference.

FIELD

The embodiment discussed herein is related to a library apparatus, a storage medium initialization method, a library controller.

BACKGROUND

Conventionally, a library apparatus including slots for storing cartridges of magnetic tapes distinguishes the cartridges of the magnetic tapes by barcodes. For example, a cartridge includes a barcode indicating an identification number and includes a cartridge memory storing management information indicating a content in a storage medium. There is a known technology, in which a library apparatus searches for management information corresponding to an identification number newly read from a barcode and displays the retrieved management information.

In the library apparatus that distinguishes cartridges (hereinafter, referred to as "media") by barcodes as described above, an initialization process is performed on a medium before operation on an unused medium.

For example, the following operation is performed as the initialization process on a medium. (1) An operator generates a barcode label, in which a predetermined label name, a medium type name, and a barcode converted from the label name and the medium type name are printed by a special printer, and attaches the barcode label on a back side of the medium. (2) The operator loads the medium to be subjected to the initialization process into a drive by operating a library apparatus. (3) The operator writes a label name or the like to a data block (hereinafter, referred to as a "VOL1") at the head of a data area of the medium by operating a console, and writes two tape marks (hereinafter, referred to as "TMs") following the data block. Meanwhile, a size of the data block is, for example, 80 bytes.

Patent Literature 1: Japanese Laid-open Patent Publication No. 2011-22720

However, the library apparatus has a problem in that it takes effort and time to set a medium to an operable state. For example, in the initialization process on a medium, an operator attaches a generated barcode label to each of media one by one. Subsequently, the operator loads the medium with the attached barcode label into a drive by operating the library apparatus, and writes a label name or the like to an appropriate portion by operating the console. Therefore, the initialization process on the medium takes effort and time.

The above described problem may occur not only in the initialization process on a medium but also in the case of changing a label name of a medium.

SUMMARY

According to an aspect of an embodiment, a library apparatus includes an initialization preparing unit and a first initializing unit. The initialization preparing unit is configured to, when accepting an initialization request to initialize a storage medium to which a wireless communication device is added, the wireless communication device including an IC chip with a storage unit for storing management information and including an electronic paper with a display unit for displaying information stored in the management information, store a label name of the storage medium and data in the management information, the label name being acquired through the initialization request, and the data being data to be written to a block used as an index label of the storage medium, to thereby perform a preparation for initialization of the storage medium. The first initializing unit is configured to, when loading the storage medium into a drive, write the data that the initialization preparing unit has stored in the management information corresponding to the storage medium to the block used as the index label of the storage medium, to thereby perform the initialization of the storage medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating another example of state transition of a medium stored in a cell of the magazine;

DESCRIPTION OF EMBODIMENT(S)

Preferred embodiments of the present invention will be explained with reference to accompanying drawings The present invention is not limited by the embodiments below. The embodiments may be combined appropriately within a scope that does not contradict the processing contents.

Configuration of Library Apparatus According to Embodiment

Figure 1:
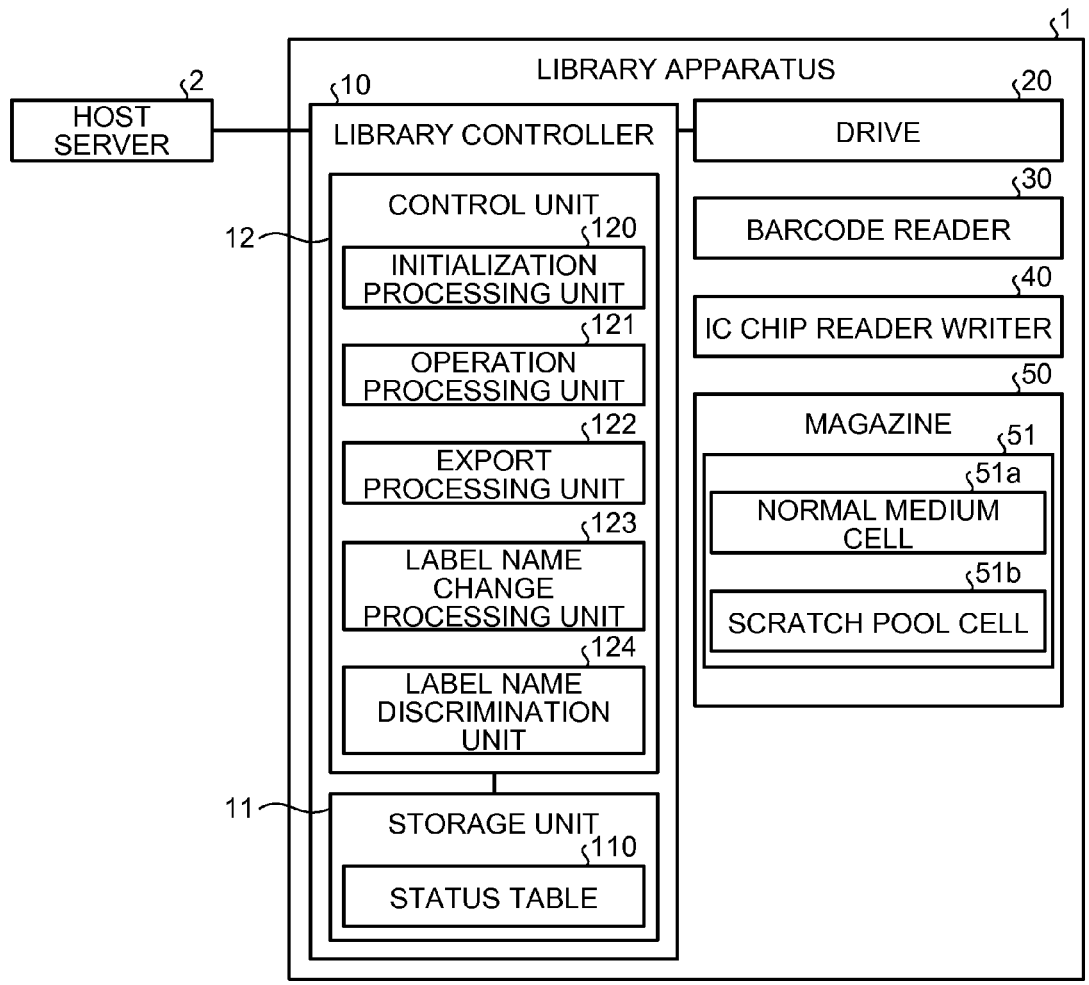
FIG. 1 is a diagram illustrating a functional configuration of a library apparatus according to an embodiment.

FIG. 1 is a diagram illustrating a functional configuration of a library apparatus according to an embodiment. As illustrated in FIG. 1, a library apparatus 1 is connected to a host server 2. The library apparatus 1 is an apparatus that includes an area for storing a cartridge (hereinafter, referred to as a "medium") of a magnetic tape, and initializes a stored medium or controls read and write from and to a stored medium. The medium according to the embodiment is a magnetic tape to which an IC tag, which includes an IC chip and an electronic paper that can display information stored in the IC chip, is added. An example of the medium according to the embodiment will be described below with reference to FIG. 2.

Figure 2:
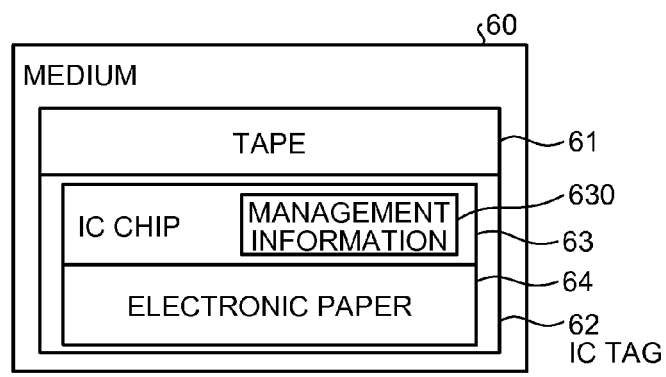
FIG. 2 is a diagram illustrating an example of a medium according to the embodiment.

FIG. 2 is a diagram illustrating an example of the medium according to the embodiment. As illustrated in FIG. 2, a medium 60 includes a tape 61 and an IC tag 62. The tape 61 means a magnetic tape. The IC tag 62 includes an IC chip 63 and an electronic paper 64. The IC chip 63 receives radio waves via a power supply antenna that enables non-contact communication, and is enabled to read and write management information 630 stored in a non-volatile memory. The electronic paper 64 includes a screen and is enabled to continuously display information on the screen without consuming power. In the embodiment, a label name is displayed on the electronic paper 64 instead of a barcode label seal attached to a surface of the medium. Contents of the management information 630 will be described later.

Referring back to FIG. 1, the library apparatus 1 includes a library controller 10, a drive 20, a barcode reader 30, an IC chip reader writer 40, and a magazine 50. The library controller 10 controls the entire library apparatus 1. The drive 20 is a device that writes data to a medium and reads data from a medium. The barcode reader 30 is a device that reads a barcode label. The barcode reader 30 is used when a barcode label seal is attached to a medium. The IC chip reader writer 40 is a device that writes various types of information to the management information 630 in the IC chip 63 and reads various types of information from the management information 630 in the IC chip 63.

The magazine 50 is a rack that includes a plurality of cells 51 and that is removably attached to the library apparatus 1. The magazine 50 is used to receive and deliver a medium when an operator inserts or ejects the medium. The cell 51 includes a normal medium cell 51a and a scratch pool cell 51b. The normal medium cell 51a is an area for storing an initialized medium. The scratch pool cell 51b is an area for storing an uninitialized medium. Meanwhile, information for distinguishing the normal medium cell 51a and the scratch pool cell 51b is stored in the management information 630 in the IC chip 63 included in the medium.

Figures 3, 4:
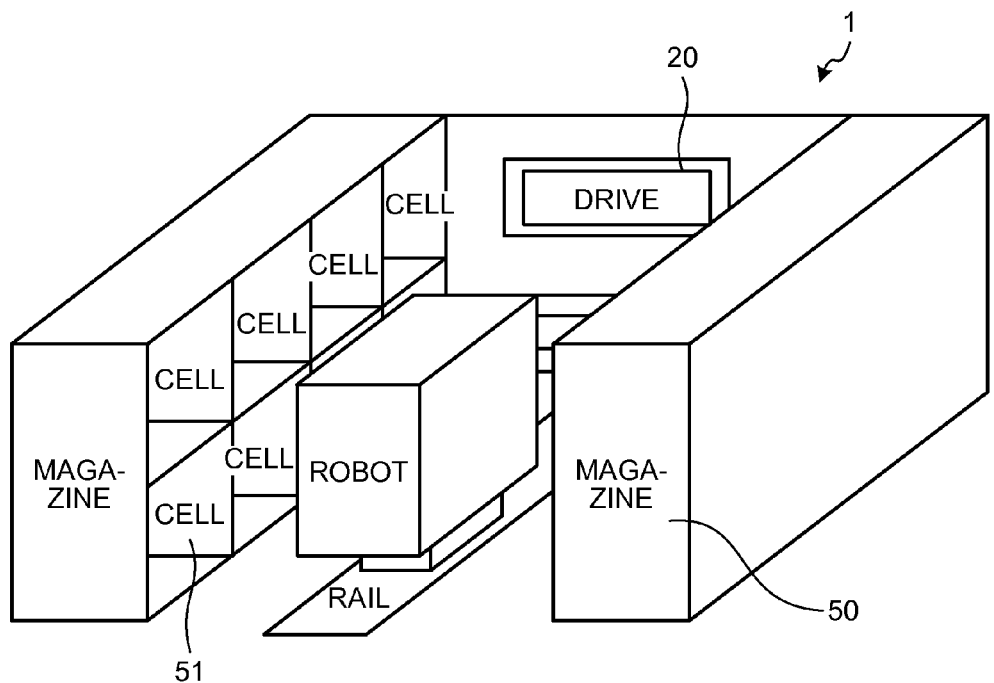
FIG. 3 is a diagram illustrating an example of a structure of the library apparatus.
FIG. 4 is a diagram illustrating an example of a data structure of management information according to the embodiment.

An example of a structure of the library apparatus 1 will be described below with reference to FIG. 3. FIG. 3 is a diagram illustrating the structure of the library apparatus. As illustrated in FIG. 3, the library apparatus 1 includes the magazine 50 and the drive 20 on an exterior thereof. The magazine 50 includes a plurality of the cells 51. The library apparatus 1 further includes a robot on a rail. The rail is used to move the robot. The robot delivers a medium stored in each of the cells 51. In the library apparatus 1, the library controller 10 is provided although not illustrated.

An example of a data structure of the management information 630 will be described below with reference to FIG. 4. FIG. 4 is a diagram illustrating an example of the data structure of the management information according to the embodiment. As illustrated in FIG. 4, the management information 630 contains a volume identifier 630a, a medium type 630b, a label name status 630c, and a label name data block 630d.

The volume identifier 630a stores therein a label name of a medium. That is, if a label name of a medium is stored in the volume identifier 630a, the label name of the medium is displayed on the electronic paper 64. The medium type 630b stores therein a type of the medium. For example, the medium type 630b stores therein "data medium" indicating a medium for reading and writing data, "cleaning medium" indicating a medium for cleaning, or the like. The label name status 630c stores therein a status indicating whether a label name is written in the medium. For example, the label name status 630c stores therein one of "write is done", "now emulating", and "no label name". "No label name" indicates that a label name is not set in the volume identifier 630a. That is, "no label name" indicates that initialization is not performed at all. "Now emulating" indicates that a label name is set in the volume identifier 630a but a label name is not written in a block (VOL1) that is used as an index label of the medium. "Write is done" indicates that a label name is set in the volume identifier 630a and a label name is also written in the VOL1 of the medium. The label name data block 630d stores therein data to be written to the VOL1 of the medium. For example, when the label name status 630c is "now emulating", data to be written to the VOL1 is stored in the label name data block 630d. The management information 630 is updated by an initialization processing unit 120, an operation processing unit 121, an export processing unit 122, and a label name change processing unit 123, which will be described later.

Referring back to FIG. 1, the library controller 10 includes a storage unit 11 and a control unit 12. The storage unit 11 corresponds to a storage device, such as a non-volatile semiconductor memory element including a flash memory and a ferroelectric random access memory (FRAM) (registered trademark). The storage unit 11 includes a status table 110. The status table 110 stores therein a status of a medium stored in each of the cells in the magazine 50.

Figure 5:
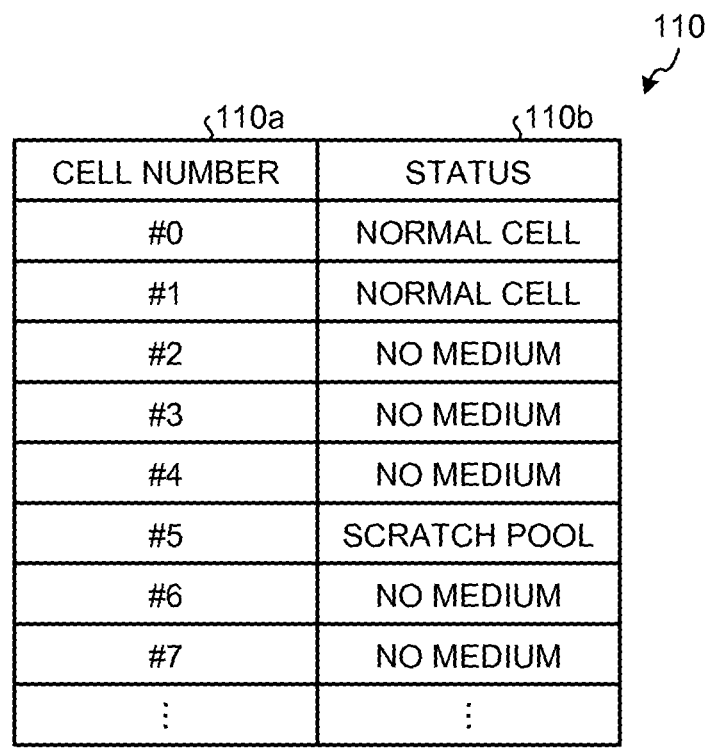
FIG. 5 is a diagram illustrating an example of a data structure of a status table according to the embodiment.

An example of a data structure of the status table 110 will be described below with reference to FIG. 5. FIG. 5 is a diagram illustrating an example of the data structure of the status table according to the embodiment. As illustrated in FIG. 5, the status table 110 stores therein a cell number 110a and a status 110b in an associated manner. The cell number 110a indicates a number of each of the cells in the magazine 50. The status 110b indicates a status of a medium stored in a cell with a number indicated by the cell number 110a. For example, the status 110b is set to "normal cell", "no medium", or "scratch pool". "Normal cell" indicates a normal medium cell with respect to a medium stored in the subject cell. That is, "normal cell" indicates a cell in which an initialized medium is stored. "No medium" indicates that a medium is not stored in the subject cell. "Scratch pool" indicates a scratch pool cell with respect to a medium stored in the subject cell. That is, "scratch pool" indicates a cell in which an uninitialized medium is stored.

As one example, when the cell number 110a is "#0", "normal cell" is stored in the status 110b. When the cell number 110a is "#2", "no medium" is stored in the status 110b. When the cell number 110a is "#5", "scratch pool" is stored as the status 110b.

The control unit 12 includes an internal memory for storing a program that defines various processing procedures and storing control data, and performs various processes by using the program and the data. The control unit 12 corresponds to an electronic circuit of an integrated circuit, such as an application specific integrated circuit (ASIC) or a field programmable gate array (FPGA). Alternatively, the control unit 12 corresponds to an electronic circuit of a central processing unit (CPU) or a micro processing unit (MPU). The control unit 12 further includes the initialization processing unit 120, the operation processing unit 121, the export processing unit 122, the label name change processing unit 123, and a label name discrimination unit 124. The initialization processing unit 120 is an example of an initialization preparing unit. The operation processing unit 121 is an example of a first initializing unit. The export processing unit 122 is an example of a second initializing unit. The status table 110 is an example of a managing unit.

The initialization processing unit 120, upon detecting that the magazine 50 is set, updates the status table 110 for all of the cells. For example, the initialization processing unit 120 acquires the management information 630 on the medium 60 stored in each of the cells 51 by using the IC chip reader writer 40. The initialization processing unit 120 sets a status of a cell storing the medium 60 with the label name status 630c of "no label name" to "scratch pool" based on the management information 630 acquired for each of the cells. The initialization processing unit 120 sets a status of a cell storing the medium 60 with the label name status 630c of "write is done" or "now emulating" to "normal cell" based on the management information 630 acquired for each of the cells. The initialization processing unit 120 sets statuses of other cells to "no medium".

The initialization processing unit 120 stores, in the management information 630, a label name of the medium 60 acquired through an initialization instruction, and data to be written to the VOL1 of the medium 60. For example, the initialization processing unit 120, upon accepting an initialization instruction on the medium 60 from the host server 2, writes the management information 630 to the IC chip 63 of the medium 60 stored in a scratch pool. In the management information 630, the label name acquired through the initialization instruction is set in the volume identifier 630a, "data medium" is set in the medium type 630b, "now emulating" is set in the label name status 630c, and the data to be written to the VOL1 is set in the label name data block 630d. An example of the data to be written to the VOL1 includes the label name and a date and time at which a process is performed by the initialization processing unit 120. The initialization processing unit 120 changes the status of the cell storing the medium 60 to "normal cell". Consequently, the initialization processing unit 120 completes a preparation for an initialization process on the medium 60. Therefore, the initialization processing unit 120 can instantly complete the preparation for the initialization process on the medium 60 by only writing the management information 630 to the IC chip 63 and changing the setting of the cell 51, without loading the medium 60 into the drive 20 and returning the medium 60 to the cell 51. Meanwhile, the initialization processing unit 120 may receive designation of each of the media 60 one by one, or may receive designation of a plurality of the media 60 at once.

The operation processing unit 121, when loading the medium 60 into the drive 20, writes a content of the label name data block 630d stored in the management information 630 corresponding to the medium 60 to the VOL1 of the medium 60. Accordingly, the operation processing unit 121 completes initialization of the medium 60. For example, the operation processing unit 121, upon accepting an instruction to load the medium 60 from the host server 2, loads the medium 60 from the cell 51 into the drive 20. Subsequently, the operation processing unit 121 checks the label name status 630c in the management information 630 stored in the IC chip 63 of the medium 60. If the label name status 630c is "now emulating", the operation processing unit 121 determines that information needed for an initialization process is not written in the medium 60. Subsequently, the operation processing unit 121 writes the content of the label name data block 630d and two TMs to the VOL1 of the medium 60. Then, the operation processing unit 121 sets the label name status 630c in the management information 630 to "write is done". Subsequently, the operation processing unit 121 performs an operation process. Consequently, the operation processing unit 121 writes the information needed for the initialization process to the medium 60 by using a timing at which the medium 60 is loaded into the drive 20; therefore, it becomes possible to efficiently complete the initialization.

The export processing unit 122, when ejecting the medium 60 from the magazine 50, writes the content of the label name data block 630d stored in the management information 630 corresponding to the medium 60 to the VOL1 of the medium 60. Accordingly, the export processing unit 122 completes the initialization of the medium 60. For example, the export processing unit 122, upon accepting an instruction to eject (detach) the magazine 50, checks the label name status 630c in the management information 630 stored in the IC chip 63. If the label name status 630c is "now emulating", the export processing unit 122 determines that the information needed for the initialization process is not written in the medium 60. Subsequently, the export processing unit 122 loads the medium 60 serving as an export (removal) target from the cell 51 into the drive 20. Then, the export processing unit 122 writes the content of the label name data block 630d and two TMs to the VOL1 of the medium 60. Subsequently, the export processing unit 122 sets the label name status 630c in the management information 630 to "write is done". Then, the export processing unit 122 unloads the medium 60 that has been loaded into the drive 20, moves the medium 60 to the original cell 51, and ejects the magazine 50. Consequently, the export processing unit 122 writes the information needed for the initialization process to the medium 60 by using a timing at which the medium 60 is ejected from the magazine 50; therefore, even in a conventional library apparatus, it becomes possible to handle the medium 60 as a medium for which the initialization process is completed.

The label name change processing unit 123, when changing the label name of the medium 60, stores, in the management information 630 corresponding to the medium 60, a status indicating that a label name is not set in the medium 60. For example, the label name change processing unit 123, upon accepting an operation completion instruction on the medium 60 whose label name is to be changed from the host server 2, checks the status 110b corresponding to the cell 51 storing the subject medium 60 based on the status table 110. If the status 110b is "normal cell", the label name change processing unit 123 changes the label name status 630c in the management information 630 stored in the IC chip 63 of the medium 60 to "no label name". Then, the label name change processing unit 123 changes the status of the cell storing the subject medium 60 to "scratch pool". Consequently, the medium 60 becomes initializable again, and, if the initialization processing unit 120 operates and also the operation processing unit 121 or the export processing unit 122 operates, the label name of the medium 60 is changed. Therefore, the label name change processing unit 123 can instantly complete write of the management information 630 to the IC chip 63 and a change in the setting of the cell 51, and also can complete a change in the label name in a short time by successively performing the initialization process.

The label name discrimination unit 124 determines whether the medium 60 stored in the magazine 50 is a medium with an IC tag. The label name discrimination unit 124 acquires a label name based on a result of the determination. For example, the label name discrimination unit 124 determines whether the IC chip 63 of the medium 60 stored in the magazine 50 is readable via the IC chip reader writer 40. If the IC chip 63 is readable, the label name discrimination unit 124 determines that the medium 60 is a medium with an IC tag. Subsequently, the label name discrimination unit 124 acquires a label name based on the management information 630 stored in the IC chip 63. If the IC chip 63 is not readable, the label name discrimination unit 124 determines that the medium 60 is not a medium with an IC tag. Subsequently, the label name discrimination unit 124 determines whether a barcode of the medium 60 stored in the magazine 50 is readable via the barcode reader 30. Then, the label name discrimination unit 124 acquires a label name based on the barcode attached to a back side of the medium 60.

Example of State Transition of Medium

Figure 6:
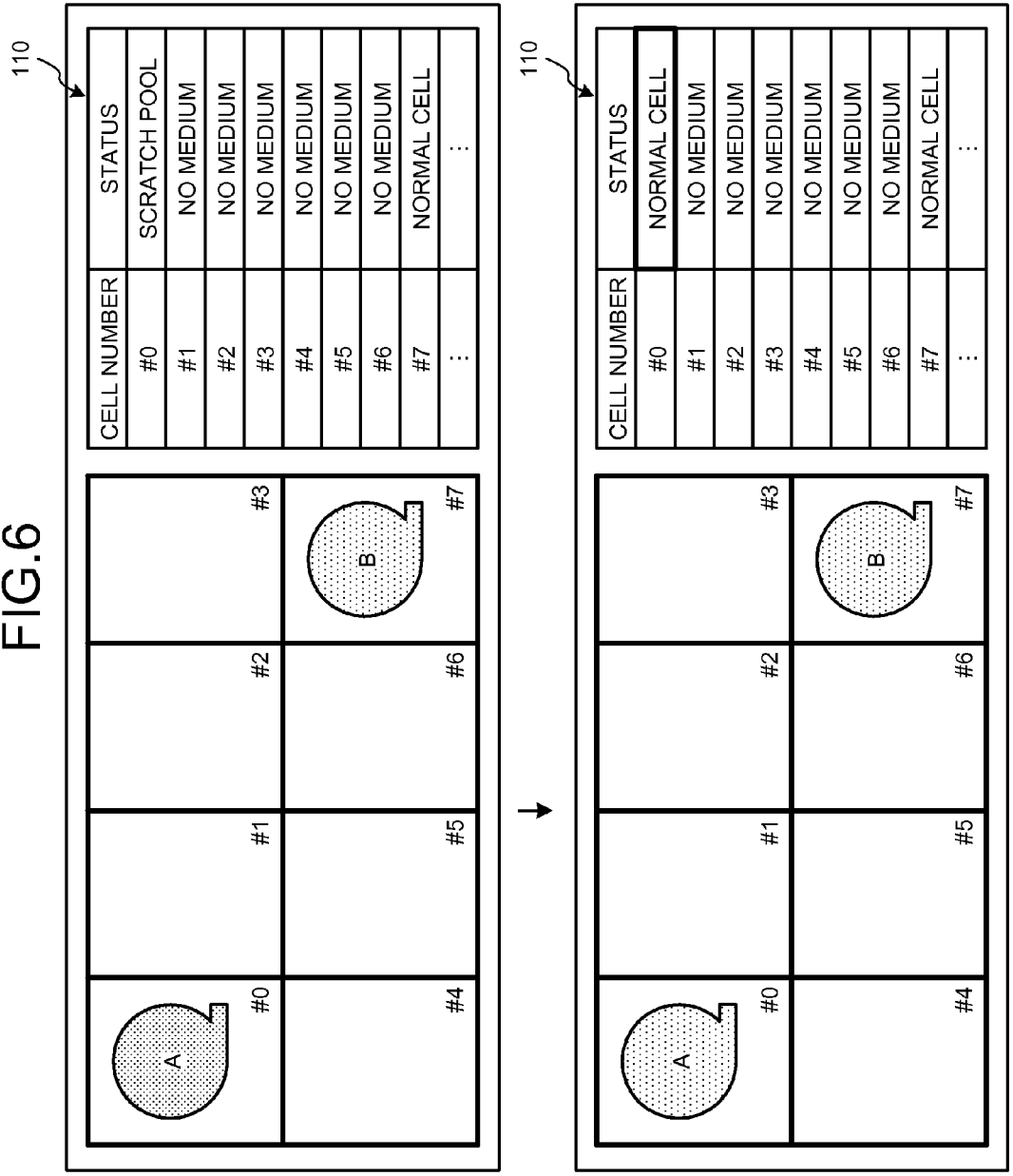
FIG. 6 is a diagram illustrating an example of state transition of a medium stored in a cell of a magazine.

An example of state transition of the medium 60 stored in the cell 51 of the magazine 50 will be described below with reference to FIG. 6. FIG. 6 is a diagram illustrating an example of the state transition of the medium stored in the cell of the magazine. In the upper part of FIG. 6, a medium A is stored in the cell 51 with the cell number of #0. In the status table 110, the status 110b corresponding to the cell number of #0 is "scratch pool". That is, the medium A is not initialized, and the label name status 630c is set to "no label name" in the management information 630 on the medium A (not illustrated). A medium B is set in the cell 51 with the cell number of #7. In the status table 110, the status 110b corresponding to the cell number of #7 is "normal cell". That is, the medium B is already initialized, and the label name status 630c is set to "write is done" in the management information 630 on the medium B (not illustrated).

In such a circumstance, it is assumed that the initialization processing unit 120 accepts an initialization instruction on the medium A stored in the cell with the cell number of #0.

Accordingly, in the lower part of FIG. 6, the initialization processing unit 120 sets a label name, which is acquired through the initialization instruction, in the volume identifier 630a in the management information 630 on the medium A. Subsequently, the initialization processing unit 120 sets "data medium" in the medium type 630b, sets "now emulating" in the label name status 630c, and sets data to be written to the VOL1 in the label name data block 630d in the management information 630 on the medium A. Then, the initialization processing unit 120 changes the status corresponding to the cell (with the cell number of #0) storing the medium A to "normal cell". Consequently, the initialization processing unit 120 completes a preparation for the initialization process on the medium A. Therefore, the initialization processing unit 120 can instantly complete the preparation for the initialization process on the medium by only writing the management information 630 to the IC chip 63 and changing the setting of the cell 51, without loading the medium A into the drive 20 and returning the medium A to the cell 51. Thereafter, the operation processing unit 121 completes the initialization process on the medium A at the time of operation.

Another example of the state transition of the medium 60 stored in the cell 51 of the magazine 50 will be described below with reference to FIG. 7. FIG. 7 is a diagram illustrating another example of the state transition of the medium stored in the cell of the magazine. FIG. 7 illustrates a state in which a medium C stored in a cell with the cell number of #3 is shifted from an initialized state to an uninitialized state. For example, it is assumed that the label name change processing unit 123 accepts an operation completion instruction on the medium C stored in the cell with the cell number of #3.

Accordingly, the label name change processing unit 123 checks the status 110b corresponding to the cell (with the cell number of #3) storing the medium C based on the status table 110. The status 110b indicates "normal cell"; therefore, the label name change processing unit 123 changes the label name status 630c in the management information 630 stored in the IC chip 63 of the medium C to "no label name". Subsequently, the label name change processing unit 123 changes the status corresponding to the cell (with the cell number of #3) storing the medium C to "scratch pool". Consequently, the medium C is shifted to the uninitialized state and becomes initializable again. Therefore, the label name change processing unit 123 can instantly realize the uninitialized state by only writing the management information 630 to the IC chip 63 and changing the setting of the cell 51, without loading the medium C into the drive 20 and returning the medium C to the cell 51. Thereafter, if the initialization process is performed on the medium C, the label name is changed.

Flowchart of Initialization Process

Figure 8:
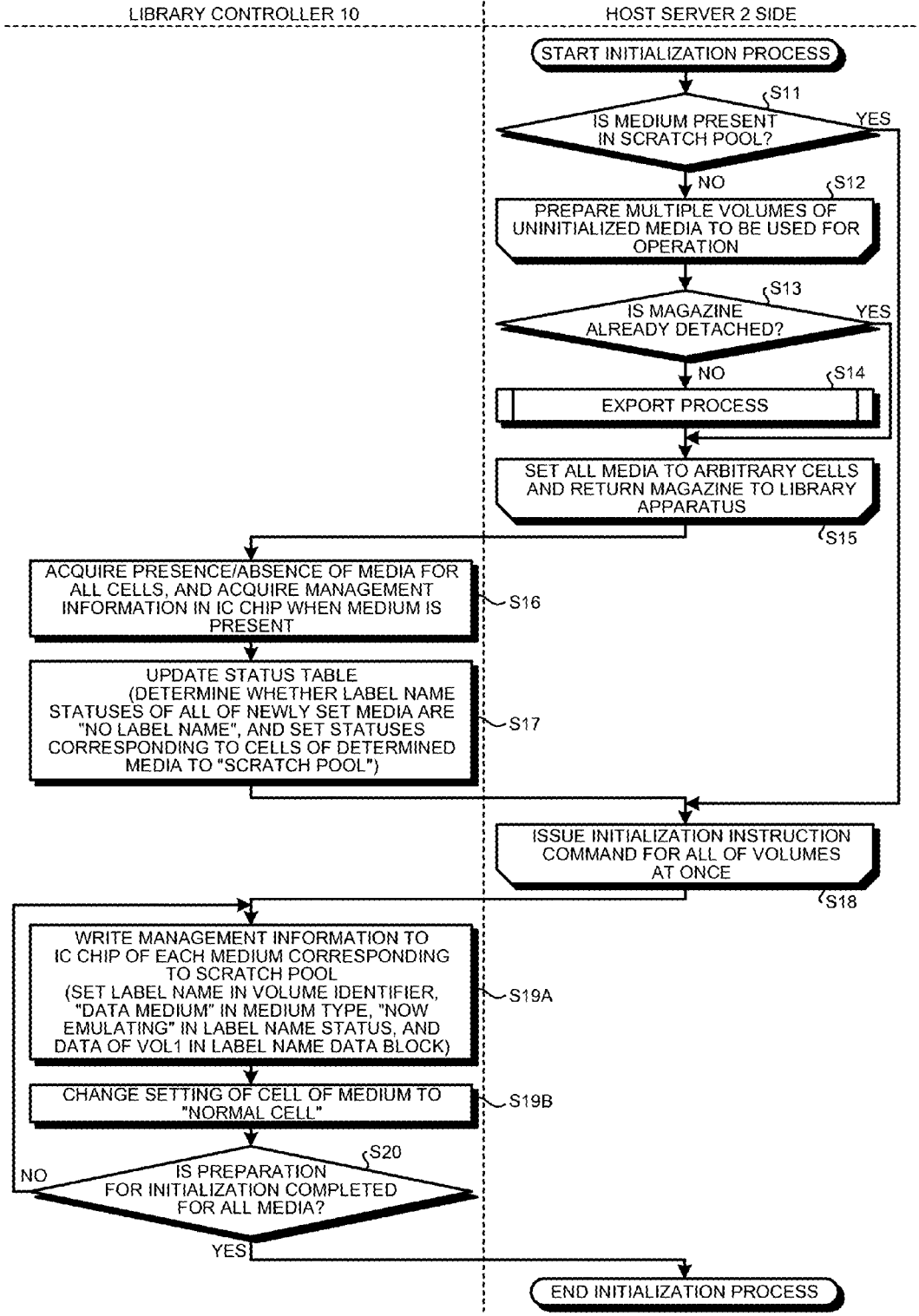
FIG. 8 is a diagram illustrating a flowchart of an initialization process according to the embodiment.

A flowchart of the initialization process performed by the initialization processing unit 120 will be described below with reference to FIG. 8. FIG. 8 is a diagram illustrating the flowchart of the initialization process according to the embodiment.

First, an operator determines whether the medium 60 is present in a scratch pool (Step S11). For example, the operator displays the status 110b of each of the cell numbers 110a stored in the status table 110 on a monitor of the host server 2. Subsequently, the operator determines whether the medium 60 is present in a cell with the cell number 110a corresponding to the status 110b of "scratch pool".

When determining that the medium 60 is present in the scratch pool (YES at Step S11), the operator proceeds to Step S18 in order to issue an initialization instruction command. On the contrary, when determining that the medium 60 is not present in the scratch pool (NO at Step S11), the operator prepares multiple volumes of the uninitialized media 60 to be used for operation (Step S12). Further, the operator determines whether the magazine 50 is already detached (Step S13).

When determining that the magazine 50 is already detached (YES at Step S13), the operator proceeds to Step S15. On the contrary, when determining that the magazine 50 is not already detached (NO at Step S13), the operator causes the export processing unit 122 to perform an export process in order to detach the magazine 50 (Step S14). Thereafter, the operator proceeds to Step S15. At Step S15, the operator sets all of the media 60 to the arbitrary cells 51, and returns the magazine 50 to the library apparatus 1 (Step S15).

Subsequently, the library controller 10, upon detecting that the magazine 50 is set, acquires presence or absence of the media 60 with respect to all of the cells 51. If the medium 60 is present, the library controller 10 acquires the management information 630 in the IC chip 63 (Step S16). For example, the library controller 10 acquires presence or absence of the media 60 and the management information 630 by operating the IC chip reader writer 40.

Then, the library controller 10 updates the status table 110 (Step S17). That is, the library controller 10 determines whether the label name statuses 630c of all of the newly set media 60 are "no label name" or not. The library controller 10 sets the statuses 110b corresponding to the cells 51 storing the media 60 determined as having "no label name" to "scratch pool".

Subsequently, the operator issues an initialization instruction command for all of the volumes at once by operating the console (Step S18). As one example, the initialization instruction command contains label names of all of the volumes.

Then, the library controller 10 writes the management information 630 to the IC chip 63 of each of the media 60 in the scratch pools based on the statuses 110b stored in the status table 110 (Step S19A). That is, the library controller 10 sets a label name contained in the initialization instruction command in each of the volume identifiers 630a. The library controller 10 sets "data medium" in the medium type 630b. The library controller 10 sets "now emulating" in the label name status 630c. The library controller 10 sets data to be written to the VOL1 in the label name data block 630d.

Subsequently, the library controller 10 changes, in the status table 110, the status 110b corresponding to the cell 51 storing the medium 60 to "normal cell" (Step S19B). Then, the library controller 10 determines whether a preparation for initialization is completed for all of the media 60 (Step S20).

When determining that the preparation for the initialization is not completed for all of the media 60 (NO at Step S20), the library controller 10 proceeds to Step S19A in order to perform the initialization process on the medium 60 for which the preparation for the initialization is not completed. On the contrary, when determining that the preparation for the initialization is completed for all of the media 60 (YES at Step S20), the library controller 10 ends the initialization process.

Flowchart of Operation Process

Figure 9:
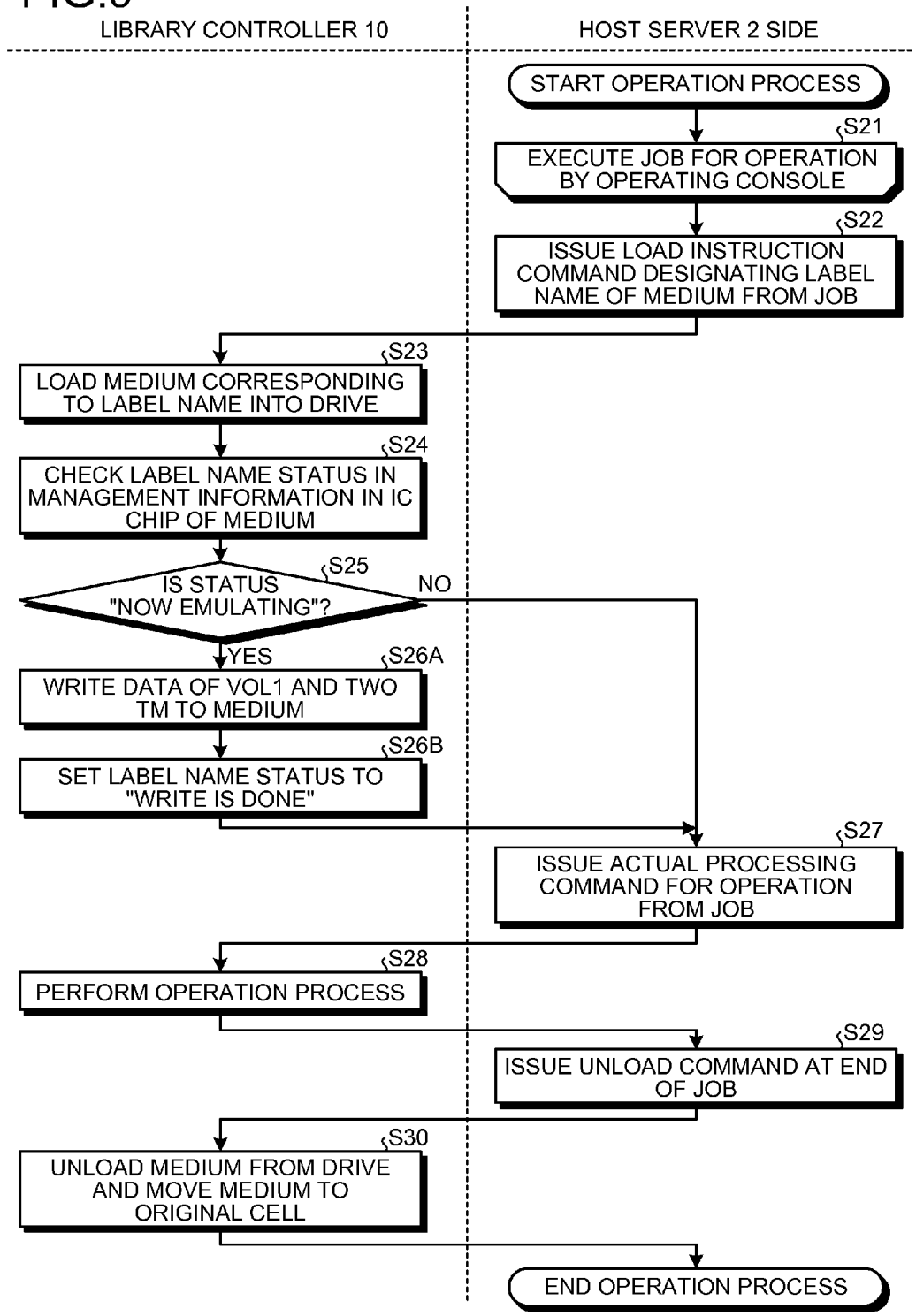
FIG. 9 is a diagram illustrating a flowchart of an operation process according to the embodiment.

A flowchart of the operation process performed by the operation processing unit 121 will be described below with reference to FIG. 9. FIG. 9 is a diagram illustrating the flowchart of the operation process according to the embodiment.

On the host server 2 side, an operator executes a job related to operation by operating the console (Step S21). Accordingly, a load instruction command designating the label name of the medium 60 is issued from the job (Step S22).

Subsequently, the library controller 10 loads the medium 60 corresponding to the label name contained in the load instruction command from the cell 51 into the drive 20 (Step S23). For example, the library controller 10 refers to the volume identifier 630a in the management information stored in the IC chip 63 of the medium 60 by operating the IC chip reader writer 40, and searches for the medium 60 that matches the designated label name. Then, the library controller 10 loads the retrieved medium 60 from the cell 51 into the drive 20 by operating the robot.

Subsequently, the library controller 10 checks the label name status 630c in the management information 630 stored in the IC chip 63 of the medium 60 by operating the IC chip reader writer 40 (Step S24). As a result of the check, the library controller 10 determines whether the label name status 630c is "now emulating" (Step S25). When determining that the label name status 630c is not "now emulating" (NO at Step S25), the library controller 10 proceeds to Step S27 in order to shift to operation.

When determining that the label name status 630c is "now emulating" (YES at Step S25), the library controller 10 determines that the information needed for the initialization process is not written in the medium 60. Subsequently, the library controller 10 writes data of the VOL1 and two TMs to the medium 60 (Step S26A). For example, the library controller 10 reads the content of the label name data block 630d in the management information 630 by operating the IC chip reader writer 40, issues a write command to the drive, and writes the content to the VOL1 of the medium 60. Then, the library controller 10 issues a write command to the drive, and writes the two TMs following the VOL1.

Subsequently, the library controller 10 sets the label name status 630c in the management information 630 to "write is done" (Step S26B). Then, the library controller 10 proceeds to Step S27 in order to shift to operation.

On the host server 2 side, an actual processing command for operation is issued from the job (Step S27). Accordingly, the library controller 10 performs the operation process based on the actual processing command (Step S28). Subsequently, the library controller 10 proceeds to Step S29.

On the host server 2 side, an unload command is issued at the end of the job (Step S29). Accordingly, the library controller 10 unloads the medium 60 from the drive 20, moves the medium 60 to the original cell 51 by operating the robot (Step S30), and ends the operation process.

Flowchart of Export Process

Figure 10:
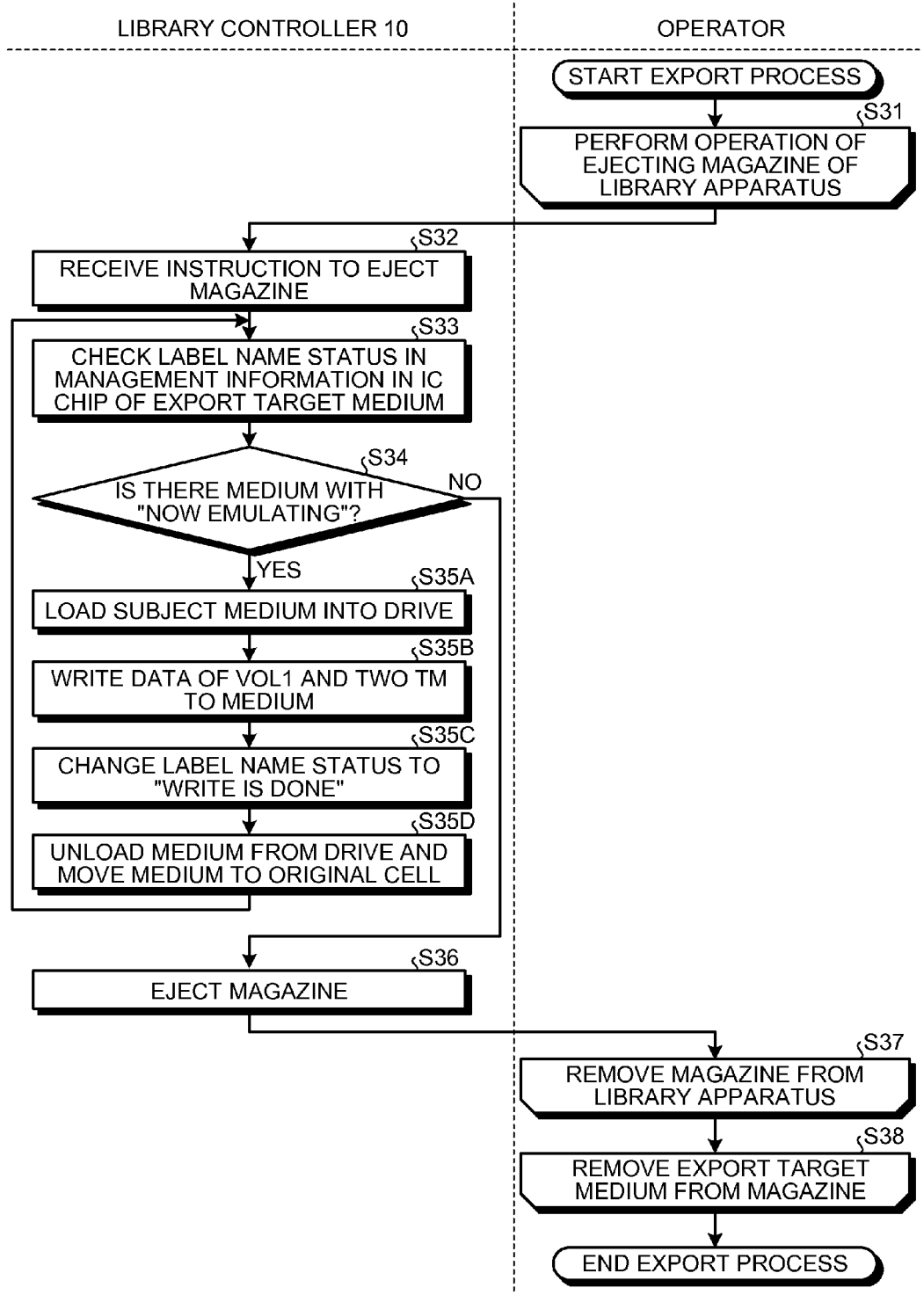
FIG. 10 is a diagram illustrating a flowchart of an export process according to the embodiment.

A flowchart of the export process performed by the export processing unit 122 will be described below with reference to FIG. 10. FIG. 10 is a diagram illustrating the flowchart of the export process according to the embodiment.

First, an operator performs operation to eject (detach) the magazine 50 included in the library apparatus (Step S31). For example, the operator presses an eject button of the library apparatus.

Accordingly, the library controller 10 receives an instruction to eject the magazine 50 (Step S32).

Subsequently, the library controller 10 checks the label name status 630c in the management information 630 stored in the IC chip 63 of the medium 60 serving as an export target by operating the IC chip reader writer 40 (Step S33). As a result of the check, the library controller 10 determines whether there is the medium 60 for which "now emulating" is set in the label name status 630c (Step S34).

When determining that there is the medium 60 for which "now emulating" is set (YES at Step S34), the library controller 10 loads the subject medium 60 from the cell 51 into the drive 20 by operating the robot (Step S35A). Subsequently, the library controller 10 writes data of the VOL1 and two TMs to the medium 60 (Step S35B). For example, the library controller 10 reads the content of the label name data block 630d in the management information 630 by operating the IC chip reader writer 40, issues a write command to the drive, and writes the content to the VOL1 of the medium 60. Then, the library controller 10 issues a write command to the drive, and writes the two TMs following the VOL1.

Subsequently, the library controller 10 changes the label name status 630c in the management information 630 to "write is done" (Step S35C). Then, the library controller 10 unloads the medium 60 from the drive 20 and moves the medium 60 to the original cell 51 by operating the robot (Step S35D). Subsequently, the library controller 10 proceeds to Step S33 in order to check the medium 60 for which "now emulating" is set.

On the contrary, when determining that there is no medium 60 for which "now emulating" is set (NO at Step S34), the library controller 10 ejects the magazine 50 (Step S36). For example, the library controller 10 ejects the magazine 50 by operating the robot.

Subsequently, the operator removes the magazine 50 from the library apparatus 1 (Step S37). Then, the operator removes, from the magazine 50, the medium 60 serving as the export target (Step S38), and ends the export process.

Flowchart of Label Name Change Process

Figure 11:
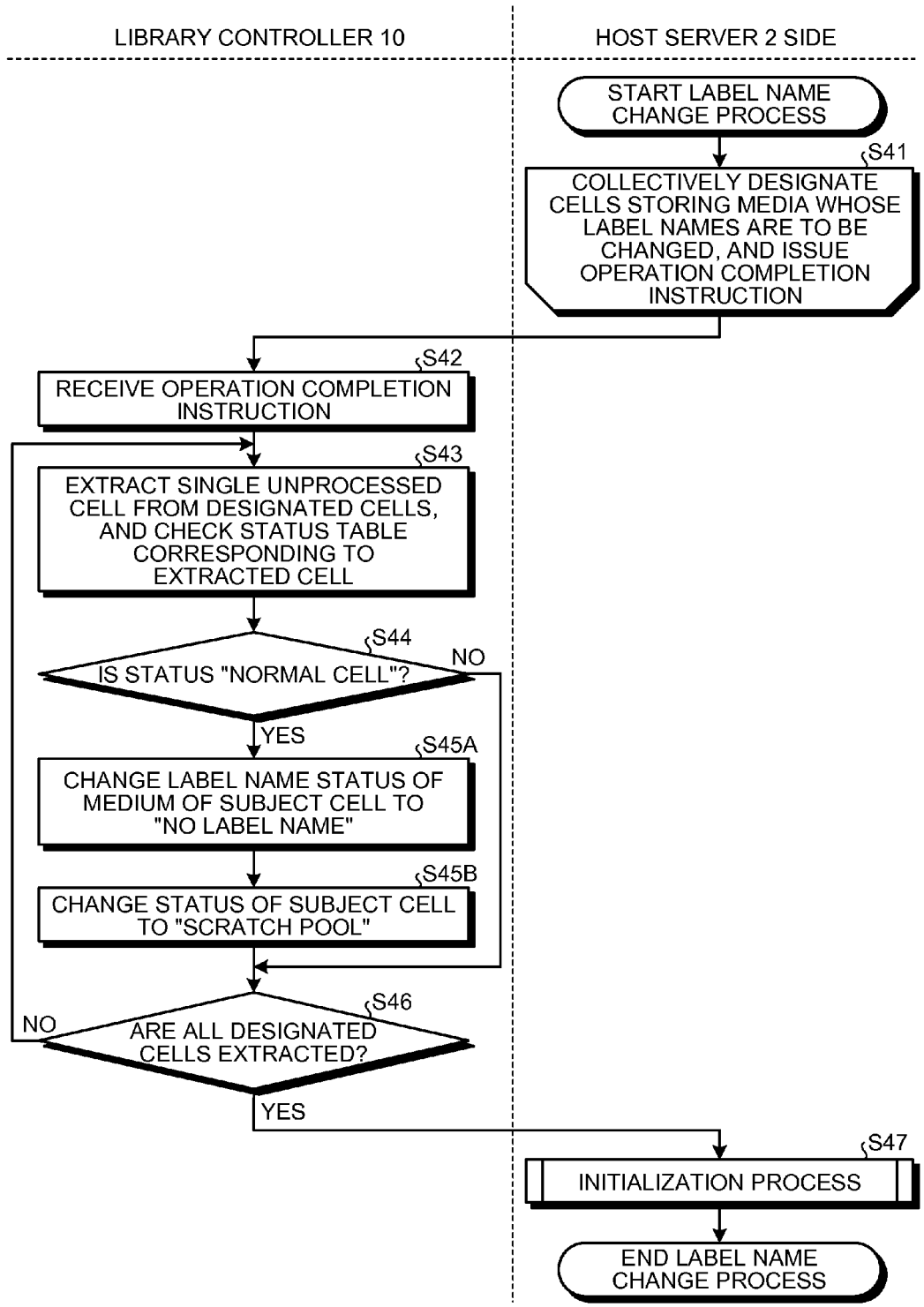
FIG. 11 is a diagram illustrating a flowchart of a label name change process according to the embodiment.

A flowchart of the label name change process performed by the label name change processing unit 123 will be described below with reference to FIG. 11. FIG. 11 is a diagram illustrating the flowchart of the label name change process according to the embodiment.

On the host server 2 side, an operator collectively designates a plurality of cells storing the media 60 whose label names are to be changed, and issues an operation completion instruction (Step S41).

Accordingly, the library controller 10 receives the operation completion instruction (Step S42). Subsequently, the library controller 10 extracts a single unprocessed cell 51 from among the designated cells 51. Then, the library controller 10 checks the status 110b in the status table 110 corresponding to the extracted cell 51 (Step S43).

As a result of the check, the library controller 10 determines whether the status 110b is "normal cell" (Step S44). When determining that the status 110b is not "normal cell" (NO at Step S44), the library controller 10 proceeds to Step S46.

On the contrary, when determining that the status 110b is "normal cell" (YES at Step S44), the library controller 10 changes the label name status 630c in the management information 630 stored in the IC chip 63 of the medium 60 stored in the subject cell 51 to "no label name" (Step S45A). Subsequently, the library controller 10 changes, in the status table 110, the status 110b corresponding to the subject cell 51 to "scratch pool" (Step S45B). Then, the library controller 10 proceeds to Step S46.

At Step S46, the library controller 10 determines whether all of the designated cells 51 are extracted (Step S46). When determining that all of the designated cells 51 are not extracted (NO at Step S46), the library controller 10 proceeds to Step S43 in order to extract the next cell 51.

On the contrary, when determining that all of the designated cells 51 are extracted (YES at Step S46), the library controller 10 causes the host server 2 side to perform the initialization process. On the host server 2 side, the operator performs the initialization process (Step S47). As a result, the library controller 10 ends the label name change process.

Flowchart of Label Name Discrimination Process

Figure 12:
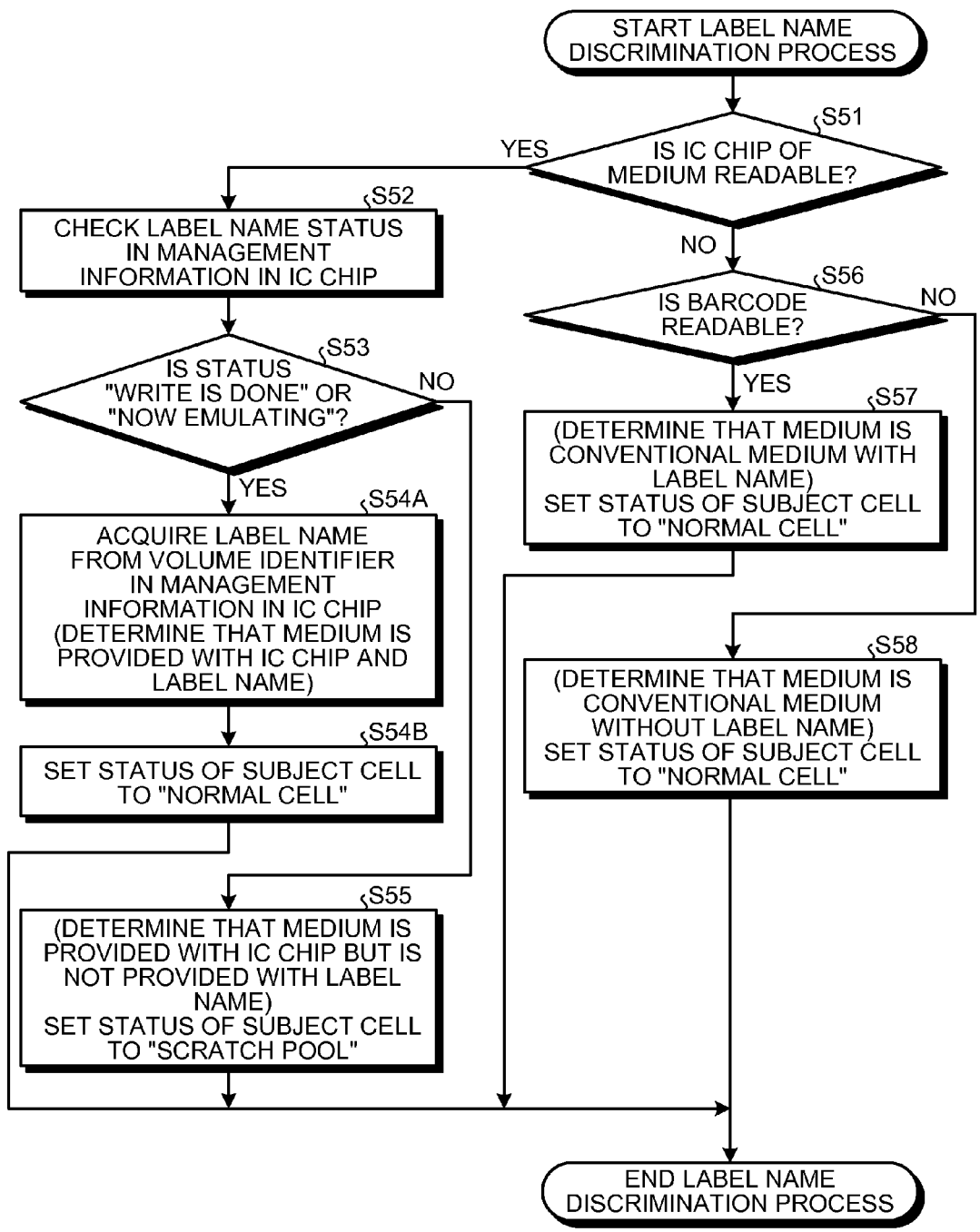
FIG. 12 is a diagram illustrating a flowchart of a label name discrimination process according to the embodiment.

A flowchart of the label name discrimination process performed by the label name discrimination unit 124 will be described below with reference to FIG. 12. FIG. 12 is a diagram illustrating the flowchart of the label name discrimination process according to the embodiment. It is assumed that the label name discrimination unit 124 receives, from the host server 2, a label name discrimination command to discriminate the label name of the medium 60 stored in the cell 51 included in the magazine 50. Meanwhile, in FIG. 12, it is assumed that the label name of the medium 60 stored in the single cell 51 included in the magazine 50 is to be discriminated.

The label name discrimination unit 124 that has received the label name discrimination command operates the IC chip reader writer 40 to determine whether the IC chip 63 of the medium 60 is readable (Step S51). When determining that the IC chip 63 of the medium 60 is readable (YES at Step S51), the label name discrimination unit 124 checks the label name status 630c in the management information 630 stored in the IC chip 63 (Step S52). Subsequently, the label name discrimination unit 124 determines whether the label name status 630c is "write is done" or "now emulating" (Step S53).

When determining that the label name status 630c is "write is done" or "now emulating" (YES at Step S53), the label name discrimination unit 124 acquires a label name from the volume identifier 630a in the management information 630 of the IC chip 63 (Step S54A). That is, the label name discrimination unit 124 determines that the medium 60 stored in the cell 51 is a medium that is provided with the IC chip 63 and the label name. Subsequently, the label name discrimination unit 124 sets, in the status table 110, the status 110b corresponding to the subject cell 51 to "normal cell" (Step S54B). Then, the label name discrimination unit 124 ends the label name discrimination process.

On the contrary, when determining that the label name status 630c is not "write is done" or "now emulating" (NO at Step S53), the label name discrimination unit 124 determines that the medium 60 stored in the cell 51 is a medium that is provided with the IC chip 63 but is not provided with a label name. Subsequently, the label name discrimination unit 124 sets, in the status table 110, the status 110b corresponding to the subject cell 51 to "scratch pool" (Step S55). Then, the label name discrimination unit 124 ends the label name discrimination process.

At Step S51, when determining that the IC chip 63 of the medium 60 is not readable (NO at Step S51), the label name discrimination unit 124 determines whether a barcode of the medium 60 is readable by operating the barcode reader 30 (Step S56). When determining that the barcode of the medium 60 is readable (YES at Step S56), the label name discrimination unit 124 determines that the medium 60 stored in the cell 51 is a conventional medium that is not provided with the IC chip 63 but is provided with the label name. Subsequently, the label name discrimination unit 124 sets, in the status table 110, the status 110b corresponding to the subject cell 51 to "normal cell" (Step S57). Then, the label name discrimination unit 124 ends the label name discrimination process.

On the contrary, when determining that the barcode of the medium 60 is not readable (NO at Step S56), the label name discrimination unit 124 determines that the medium 60 stored in the cell 51 is a conventional medium that is not provided with the IC chip 63 and a label name. Subsequently, the label name discrimination unit 124 sets, in the status table 110, the status 110b corresponding to the subject cell 51 to "normal cell" (Step S58). Then, the label name discrimination unit 124 ends the label name discrimination process.

Incidentally, the label name discrimination unit 124 may output the acquired label name and the result of the discrimination on the designated cells 51 to the monitor of the host server 2. Accordingly, the operator can determine whether the medium 60 stored in each of the cells 51 is a medium provided with the IC chip 63 and the label name, and can change a method of the initialization process for each of the media 60. That is, when the medium 60 stored in the cell 51 is a medium that is provided with the IC chip 63 but is not provided with a label name, it is sufficient that the operator performs the initialization process according to the embodiment. When the medium 60 stored in the cell 51 is a medium that is not provided with the IC chip 63 and a label name, it is sufficient that the operator performs the conventional initialization process.

Advantages of Embodiment

According to the above described embodiment, the medium 60 includes the IC tag 62, which includes the IC chip 63 with a storage unit for storing the management information 630 and includes the electronic paper 64 with the display unit for displaying information stored in the management information 630. When accepting an initialization request to initialize the medium 60, the library controller 10 stores, in the management information 630, a label name of the medium 60 acquired through the initialization request and data to be written to the VOL1 of the medium 60, to thereby perform a preparation for the initialization of the medium 60. Subsequently, the library controller 10, when loading the medium 60 into the drive 20, writes the data stored in the management information 630 corresponding to the medium 60 to the VOL1 of the storage medium, to thereby perform the initialization of the medium 60. With this configuration, the library controller 10 can instantly complete the preparation for the initialization of the medium 60 by only writing information needed for the initialization in the management information 630, without loading the medium 60 into the drive 20. Further, the library controller 10 writes the information needed for the initialization to the medium 60 at a timing at which the medium 60 is loaded into the drive 20, so that it becomes possible to efficiently perform the initialization of the medium 60. Furthermore, the electronic paper 64 displays a label name stored in the management information 630 of the medium 60 on the display unit; therefore, as compared to a conventional method of attaching a barcode label seal to the medium 60, it becomes possible to instantly complete the initialization process.

Moreover, according to the above described embodiment, the library controller 10 sets, in the management information 630 corresponding to the medium 60, a first state indicating that data is not written to the VOL1 of the medium 60, through the preparation for the initialization. Furthermore, the library controller 10 sets, in the management information 630 corresponding to the medium 60, a second state indicating that data is written to the VOL1 of the medium 60, through the execution of the initialization. If the first state is set in the management information 630 corresponding to the medium 60 when the medium 60 is to be discharged, the library controller 10 writes the data stored in the management information 630 to the VOL1 of the medium 60 so as to set the second state in the management information 630, to thereby complete the initialization of the medium 60. With this configuration, the library controller 10 can perform initialization of the medium 60 even when the medium 60 is discharged, and it becomes possible to handle the medium 60 as a medium for which the initialization process is completed even in the conventional library apparatus.

Furthermore, according to the above described embodiment, when accepting a request to change the label name of the medium 60, the library controller 10 sets, in the management information 630 corresponding to the medium 60, a third state indicating that the medium 60 is not initialized. The library controller 10 subsequently performs a preparation for initialization. With this configuration, the library controller 10 creates a state in which the medium 60 is not initialized by only writing the state in the management information 630 without loading the medium 60 into the drive 20, and subsequently shifts to the initialization, thereby making it possible to efficiently perform the label name change process.

Moreover, according to the above described embodiment, the library controller 10 stores, in the status table 110, a state related to the initialization of the medium 60 for each of the cells for storing the media 60. Then, the library controller 10 sets the state stored in the status table 110 from the uninitialized state to the initialized state with respect to a cell corresponding to the medium 60 for which the preparation for the initialization has been performed. Subsequently, when accepting a request to change the label name of the medium 60, the library controller 10 sets the state stored in the status table 110 from the initialized state to the uninitialized state with respect to the cell corresponding to the medium 60. With this configuration, the library controller 10 stores, in the status table 110, a state related to the initialization of the medium 60 stored in each of the cells, so that it becomes possible to notify the operator of the state related to the initialization of the medium 60 for each of the cells.

Others

The components of the library apparatus 1 illustrated in the drawings do not necessarily have to be physically configured in the manner illustrated in the drawings. In other words, specific forms of disintegration and integration of the library apparatus 1 are not limited to those illustrated in the drawings, and all or part of the apparatus may be functionally or physically disintegrated or integrated in arbitrary units depending on various loads or use conditions. For example, the initialization processing unit 120 and the label name change processing unit 123 may be integrated into a single initialization processing unit. Further, the initialization processing unit 120 may be disintegrated into a first setting unit that sets a status corresponding to the cell 51 storing the medium 60, and a second setting unit that sets a label name in the management information 630 on the medium 60 whose status corresponds to a scratch pool.

Figure 13:
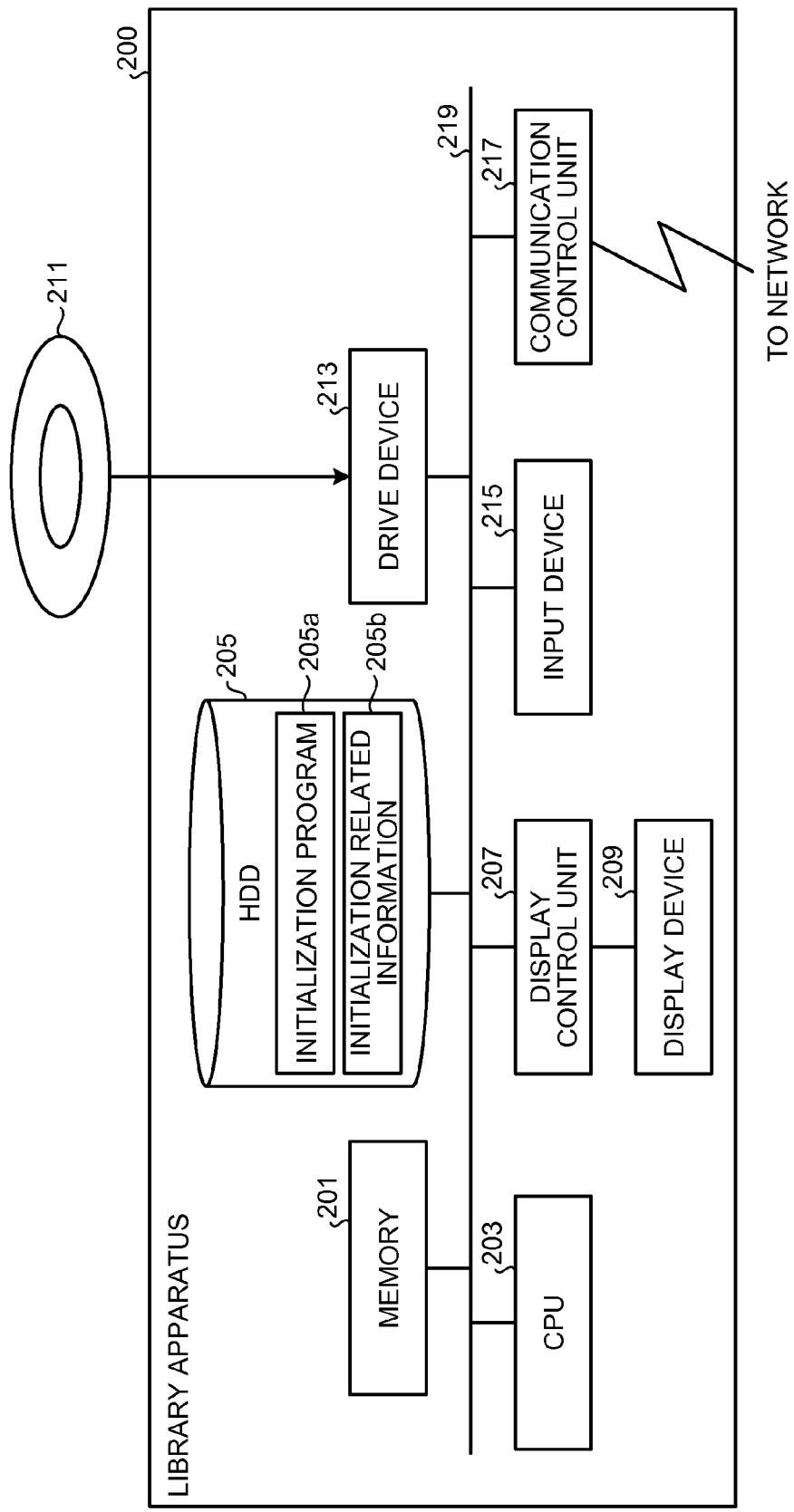
FIG. 13 is a block diagram illustrating a hardware configuration of a library apparatus that executes an initialization program.

The various processes described in the above embodiment may be realized by executing a prepared program on a computer, such as a personal computer or a workstation. In the following, an example of a computer that executes an initialization program for implementing the same functions as those of the library apparatus 1 illustrated in FIG. 1 will be described. FIG. 13 is a block diagram illustrating a hardware configuration of a library apparatus that executes the initialization program.

As illustrated in FIG. 13, a library apparatus 200 includes a CPU 203 that executes various arithmetic processing, an input device 215 that accepts input of data from a user, and a display control unit 207 that controls a display device 209. Further, the library apparatus 200 includes a drive device 213 that reads a program or the like from a storage medium, and a communication control unit 217 that transmits and receives data to and from other computers via a network. Furthermore, the library apparatus 200 includes a memory 201 for temporarily storing various types of information, and includes an HDD 205. The memory 201, the CPU 203, the HDD 205, the display control unit 207, the drive device 213, the input device 215, and the communication control unit 217 are connected to one another via a bus 219.

The drive device 213 is a device for a portable storage medium, such as a removable disk 211. The HDD 205 stores therein an initialization program 205a and initialization related information 205b.

The CPU 203 reads the initialization program 205a, loads the program to the memory 201, and executes the program as processes. The processes correspond to the respective functional units of the control unit 12. The initialization related information 205b corresponds to the status table 110. For example, the removable disk 211 stores therein various types of information, such as the status table 110.

The initialization program 205a need not be stored in the HDD 205 from the beginning. For example, the program may be stored in a "portable physical medium", such as a flexible disk (FD), a compact disk (CD)-ROM, a digital versatile disk (DVD), a magneto optical disk, or an integrated circuit (IC) card, that is insertable to the library apparatus 200. Then, the library apparatus 200 may read the initialization program 205a from the above described medium and execute the program.

According to an aspect of the library apparatus of the present disclosure, it is possible to efficiently shift a magnetic tape medium to an operable state.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A library apparatus comprising:
an initialization preparing unit configured to, when accepting an initialization request to initialize a storage medium to which a wireless communication device is added, the wireless communication device including an IC chip with a storage unit for storing management information and including an electronic paper with a display unit for displaying information stored in the management information, store a label name of the storage medium and data in the management information, the label name being acquired through the initialization request, and the data being data to be written to a block used as an index label of the storage medium, to thereby perform a preparation for initialization of the storage medium; and
a first initializing unit configured to, when the storage medium is to be loaded into a drive and data is not written in the block used as the index label of the storage medium, write the data that the initialization preparing unit has stored in the management information corresponding to the storage medium to the block used as the index label of the storage medium, to thereby perform the initialization of the storage medium.

2. The library apparatus according to claim 1, wherein the initialization preparing unit sets a first state in the management information corresponding to the storage medium for which the preparation for the initialization has been performed, the first state indicating that data is not written in the block used as the index label of the storage medium,
the first initializing unit sets a second state in the management information corresponding to the storage medium for which the initialization has been performed, the second state indicating that data is written to the block used as the index label of the storage medium, and
the library apparatus further comprises:
a second initializing unit configured to, when the storage medium is to be discharged and the first state is set in the management information corresponding to the storage medium, write the data stored in the management information to the block used as the index label of the storage medium, and set the second state in the management information, to thereby perform the initialization of the storage medium.

3. The library apparatus according to claim 2, further comprising a label changing unit configured to, when accepting a request to change the label name of the storage medium, set a third state indicating that the storage medium is not initialized in the management information corresponding to the storage medium, and cause the initialization preparing unit to sequentially operate.

4. The library apparatus according to claim 3, further comprising:
a managing unit configured to manage a state related to initialization of the storage medium stored in each of storage areas for storing the storage media, wherein
the label changing unit sets the state managed by the managing unit from an initialized state to an uninitialized state with respect to a storage area of the storage medium.

5. The library apparatus according to claim 2, further comprising:
a managing unit configured to manage a state related to initialization of the storage medium stored in each of storage areas for storing the storage media, wherein
the initialization preparing unit sets the state managed by the managing unit from an uninitialized state to an initialized state with respect to a storage area of a storage medium for which the preparation for the initialization has been performed.

6. A storage medium initialization method performed by a library apparatus including an area for storing a storage medium, the storage medium initialization method comprising:
storing, when accepting an initialization request to initialize a storage medium to which a wireless communication device is added, the wireless communication device including an IC chip with a storage unit for storing management information and including an electronic paper with a display unit for displaying information stored in the management information, a label name of the storage medium and data in the management information, the label name being acquired through the initialization request, and the data being data to be written to a block used as an index label of the storage medium, thereby performing a preparation for initialization of the storage medium; and
writing, when the storage medium is to be loaded into a drive and data is not written in the block used as the index label of the storage medium, the data that has been stored in the management information corresponding to the storage medium to the block used as the index label of the storage medium, thereby performing the initialization of the storage medium.

7. A non-transitory computer-readable recording medium storing therein a storage medium initialization program that causes a library apparatus including an area for storing a storage medium to execute a process comprising:
storing, when accepting an initialization request to initialize a storage medium to which a wireless communication device is added, the wireless communication device including an IC chip with a storage unit for storing management information and including an electronic paper with a display unit for displaying information stored in the management information, a label name of the storage medium and data in the management information, the label name being acquired through the initialization request, and the data being data to be written to a block used as an index label of the storage medium, thereby performing a preparation for initialization of the storage medium; and
writing, when the storage medium is to be loaded into a drive and data is not written in the block used as the index label of the storage medium, the data that has been stored in the management information corresponding to the storage medium to the block used as the index label of the storage medium, thereby performing the initialization of the storage medium.

8. A library controller comprising:
an initialization preparing unit configured to, when accepting an initialization request to initialize a storage medium to which a wireless communication device is added, the wireless communication device including an IC chip with a storage unit for storing management information and including an electronic paper with a display unit for displaying information stored in the management information, store a label name of the storage medium and data in the management information, the label name being acquired through the initialization request, and the data being data to be written to a block used as an index label of the storage medium, to thereby perform a preparation for initialization of the storage medium; and a first initializing unit configured to, when the storage medium is to be loaded into a drive and data is not written in the block used as the index label of the storage medium, write the data that the initialization preparing unit has stored in the management information corresponding to the storage medium to the block used as the index label of the storage medium, to thereby perform the initialization of the storage medium.

\* \* \* \* \*